Oct. 31, 1961 J. BRINN 3,006,425
PARKING AID

Filed Aug. 17, 1959 2 Sheets-Sheet 1

INVENTOR.
Jule Brinn
BY
Bryce Beecher
ATTORNEY

Oct. 31, 1961  J. BRINN  3,006,425
PARKING AID
Filed Aug. 17, 1959  2 Sheets-Sheet 2
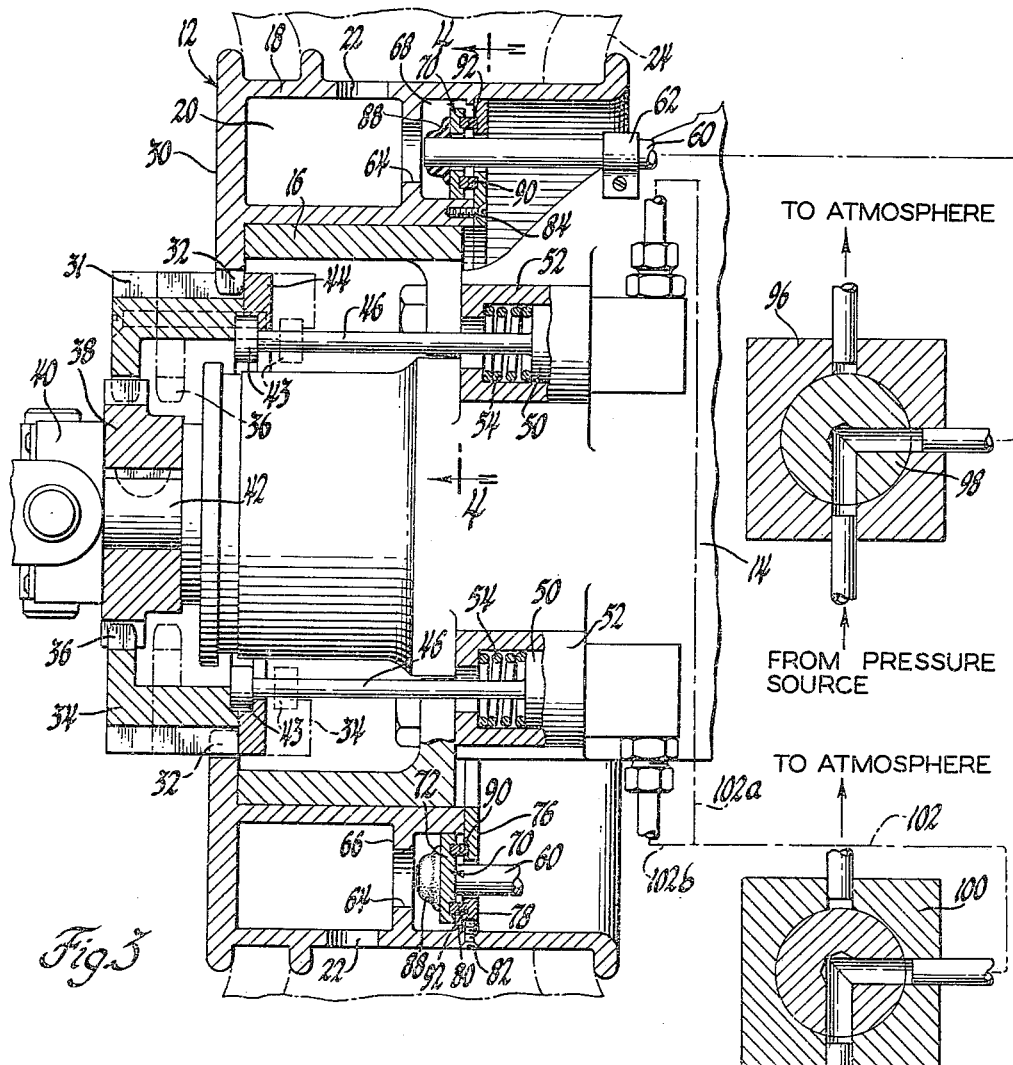
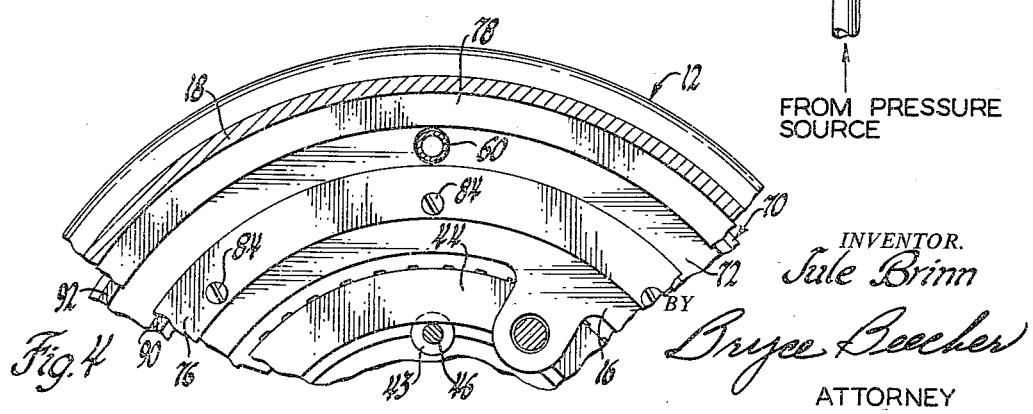
INVENTOR.
Jule Brinn
BY
Bryce Beecher
ATTORNEY 3,006,425
PARKING AID
Jule Brinn, Oak Park, Mich., assignor to General Motors Corporation, Detroit, Mich., a corporation of Delaware
Filed Aug. 17, 1959, Ser. No. 834,154
9 Claims. (Cl. 180—1)

This invention relates to a parking aid having particular significance with respect to parallel parking, i.e., the parking of a vehicle in parallel relation to a curb.

The parking problem in urban areas has become so acute that it is now a factor considered in the selection of a vehicle, especially by those whose pursuits demand a large amount of city driving. Thus it is contended that there are many individuals who really prefer the riding comfort of the larger vehicles, but who nevertheless operate so-called "compact" cars in the interest of gaining the advantage of easier parking and maneuvering in close quarters.

As suggested, the present invention has as its principal object to provide means facilitating the parking and close-quarter maneuvering of the larger vehicles.

Other objects and features of the invention will be apparent from the following description of a preferred embodiment illustrated by the accompanying drawings wherein:

FIGURE 3 is an enlarged view of the apparatus, with certain parts being shown broken away or in section and with auxiliary parts not appearing in FIGURE 1 illustrated in essentially diagrammatic fashion; and FIGURE 4 is a view on the line 4—4 in FIGURE 3.

Figure 1:
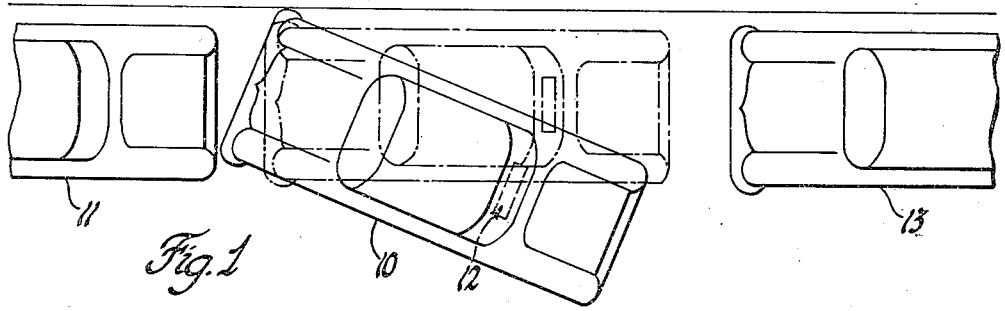
FIGURE 1 illustrates a parking operation as carried out with the aid of the invention.

Referring first to FIGURE 1, there will be seen between parked vehicles 11 and 13 a vehicle 10 which in addition to the usual four road wheels carries an auxiliary wheel 12. This auxiliary wheel 12 (FIGURES 2 and 3) is supported by the differential housing 14 which has fixed thereto a bushing 16 on which the wheel is adapted to rotate.

Figure 2:
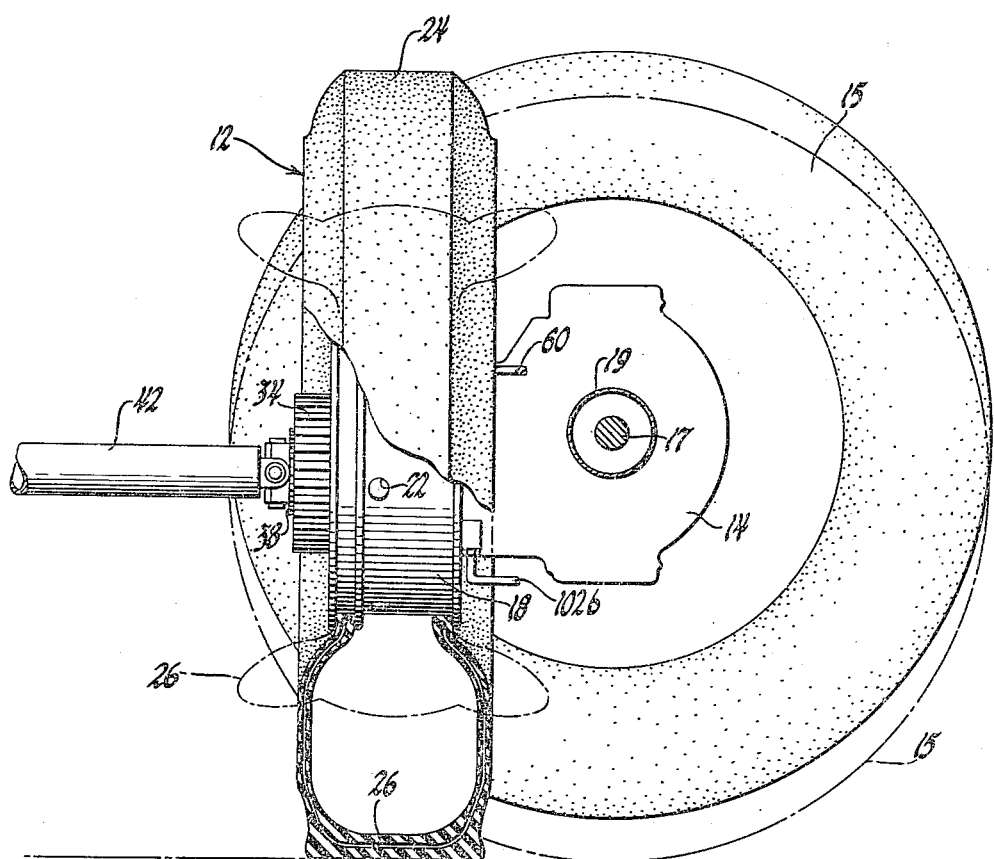
FIGURE 2 illustrates the relative disposition of the apparatus herein and the parts of the vehicle with which it is directly associated.

In FIGURE 2 there is shown in addition to the auxiliary wheel a rear road wheel 15 which is operably connected to the drive axle 17 confined within housing 19.

The rim portion 18 of the wheel 12 (FIG. 3) is formed to provide an annular chamber 20 which opens via apertures 22 to the tire 24, mounted on the rim portion 18. Tire 24 is shown as incorporating a spring element 26 circumferentially continuous with the tire and acting, when the tire is deflated, to maintain it in a radially contracted condition as illustrated in dot and dash lines in FIGURE 2.

Rim portion 18 comprises an annular wall portion 30 having a toothed inner circumference, the teeth being denoted by the numeral 32 in FIGURE 3. These teeth 32 mate with the peripheral teeth 31 of a gear 34 having a second series of teeth 36 whereby the gear is adapted to mesh with a gear 38 keyed to the right hand component 40 of a universal joint at the rear end of propeller shaft 42. Such shaft is, of course, driven by the vehicle engine through a transmission, not shown.

Gear 34 has secured thereto an annular plate 44, the gear and plate being formed to provide a circular recess for the accommodation of rollers 43 carried by piston shafts 46. The corresponding pistons 50 are housed within cylinders 52 fixed to the differential housing 14. Pistons 50 have associated therewith springs 54 tending to displace the pistons rightwardly so as to bring about disengagement of the gears 34 and 38.

It is important to observe that the normal position of gear 34, i.e., the position of the gear when the vehicle is travelling down the roadway, is as illustrated in dot and dash lines.

Air conduits 60, fixedly connected to the differential housing 14 by means of brackets 62, will be seen opening to the previously mentioned chamber 20 through apertures 64 formed in a web portion 66 of the rim 18. An annular chamber 68 delineated in part by the web portion 66 houses a sealing slip ring assembly 70 comprising a ring piece 72 disposed within the chamber 68 and concentric ring members 76 and 78. Member 78 shoulders against an annular ridge 80, shown integral with rim 18, being held against such ridge by screws 82. Ring member 76 is similarly secured to the rim 18 by screws 84. Both ring members and the ring piece 72, which is engaged by seals 88 at the end of the conduits 60 within the chamber 68, are annularly recessed for the accommodation of slip rings 90 and 92.

With the arrangement as described and illustrated, it should be apparent that the wheel 12 is permitted to rotate relative to conduits 60 and the ring piece 72, such rotation being marked by slippage between the rings 90 and 92.

Flow of air in conduit 60 is under the control of a valve 96 comprising a spool 98. It should be evident that with the spool 98 in its shown position, air is permitted to flow from the pressure reservoir carried by the vehicle through the conduits 60 into the annular chamber 20 and thence to the tire 24. And it should be equally clear that on counterclockwise rotation of spool 98, ninety degrees from the position shown, the tire 24 is caused to vent to the atmosphere.

A valve 100 similar to valve 96 controls the air flow in a conduit 102 which opens to branch lines 102a and 102b extending to the cylinders 52.

To describe now a parking operation as carried out according to the invention, let it be assumed that the vehicle (10) has been angled into the parking space as shown in solid lines in FIGURE 1. At this point, the rear road wheel 15 (FIGURE 2) is in its normal or dot and dash line position, while tire 24 is in its deflated condition, also as illustrated in dot and dash lines.

With the car so angled, the operator turns the spool of the valve 100 to its shown position (FIGURE 3), air from the pressure source being thus caused to force pistons 50 leftwardly against the resistance of springs 54 to bring about engagement of gears 34 and 38, operably linking wheel 12 with propeller shaft 42. The vehicle at this time being stationary, the propeller shaft is not rotating, hence the intermeshing of gears 34 and 38, which actually constitute a dog clutch, is easily effected.

Once the connection with the propeller shaft is made, valve 96 which, like valve 100 is located so as to be readily accessible to the operator, is manipulated by turning spool 98 to its shown position to quickly inflate tire 24. The inflation of the tire 24 is accompanied by elevation of the road wheel 15 to its position indicated in solid lines in FIGURE 2.

With the road wheels elevated, the vehicle transmission shift lever is placed in reverse position and the accelerator depressed to bring about clockwise rotation of the propeller shaft 42. In this way, the rear end of the vehicle is caused to swing toward the curb giving the vehicle the disposition shown in dot and dash lines in FIGURE 1. Finally, before leaving the vehicle, the operator normally turns both valves to vent position, valve 100 being manipulated first as before, thus effecting disengagement of gears 34 and 38 through the force of springs 54, and deflation of tire 24 with restoration of the road wheels to their road-engaging position.

To remove the vehicle from the parking space, the operator sequentially manipulates valves 100 and 96 as he did initially in parking the vehicle, places the transmission shift lever in drive position (low gear) and accelerates to effect clockwise rotation of the propeller shaft and auxiliary wheel. As the vehicle again assumes the angular position shown in solid lines in FIGURE 1, the operator turns the valves to vent position and thereafter with the road wheels in engagement with the road surface shifts the transmission lever to reverse. This accomplished, the operator backs the vehicle into the street to an extent enabling him to clear vehicle 11 on his subsequent forward movement.

It will, of course, be understood that commercial embodiments of the invention will comprise suitable safety switches or indicating devices precluding mishaps which might otherwise occur.

As perhaps suggested by FIGURE 1, housing of the upper portion of the auxiliary wheel in a nacelle or compartment behind the rear seat of the vehicle is contemplated.

There are several practical advantages possessed by the apparatus herein which should be particularly noted. Thus, a simple dog clutch answers to the function of the complex power take-offs required according to prior designs. Additionally, no special controls are needed to bring about the swinging movement of the rear end of the vehicle in the desired direction, this being determined by the setting of the transmission control lever. Nor is a special brake required as in other installations, since application of the service brakes operates to arrest rotation of the propeller shaft and consequently of the fifth wheel.

I claim:

1. Apparatus for facilitating parking of a vehicle having a pair of rear road wheels whose axes are fixed and disposed in transverse relation to the longitudinal center line of the vehicle, said apparatus including an auxiliary wheel carried by the vehicle at the rear thereof with its axis disposed in fixed parallel relation to said center line, said last axis having a fixed position with reference to said axes under all operating conditions of the vehicle, a pneumatic tire on said auxiliary wheel incorporating means whereby the tire when in deflated condition is radially contracted and out of contact with the road surface, such condition being the normal condition of said tire, means carried by the vehicle for driving said auxiliary wheel in either direction, a source of air pressure carried by the vehicle and means having connection with said source for inflating and deflating said tire, the latter when in inflated condition having a diameter such that it engages the road surface to maintain said road wheels in an elevated position with respect to such surface.

2. In a vehicle comprising a differential housing at the rear thereof, together with a propeller shaft operably connected to the mechanism within said housing and a pair of rear road wheels whose axes are fixed and disposed in transverse relation to the longitudinal center line of the vehicle, apparatus for facilitating parking of the vehicle including: an auxiliary wheel rotatably carried by said differential housing with its axis disposed in fixed parallel relation to said center line, said axis having a fixed position with reference to said axes under all operating conditions of the vehicle, a pneumatic tire on said auxiliary wheel incorporating means whereby the tire when in deflated condition is radially contracted and out of contact with the road surface, such condition being the normal condition of said tire, means carried by the vehicle for driving said auxiliary wheel in either direction, a source of air pressure carried by the vehicle and means having connection with said source for inflating and deflating said tire, the latter when in inflated condition having a diameter such that it engages the road surface to maintain said road wheels in an elevated position with respect to such surface.

3. In a vehicle comprising a differential housing at the rear thereof, together with a propeller shaft operably connected to the mechanism within said housing and a pair of rear road wheels whose axes are fixed and disposed in transverse relation to the longitudinal center line of the vehicle, apparatus for facilitating parking of the vehicle including: an auxiliary wheel rotatably carried by said differential housing with its axis disposed in substantially parallel relation to said center line, said axis having a fixed position with reference to said axes under all operating conditions of the vehicle, a pneumatic tire on said auxiliary wheel incorporating means whereby the tire when in deflated condition is radially contracted and out of contact with the road surface, such condition being the normal condition of said tire, clutch means for coupling said auxiliary wheel to and for disengaging it from said propeller shaft, a source of air pressure carried by the vehicle, and means connected to said source for inflating and deflating said tire, the latter when in inflated condition having a diameter such that it engages the road surface to maintain said road wheels in elevated position with respect to such surface.

4. Apparatus as defined by claim 3 where said clutch means is pneumatically operated, the necessary air pressure being derived from said source.

5. In a vehicle comprising a differential housing at the rear thereof, together with a propeller shaft operably connected to the mechanism within said housing and a pair of rear road wheels whose axes are fixed and disposed in transverse relation to the longitudinal center line of the vehicle, apparatus for facilitating parking of the vehicle comprising: an auxiliary wheel rotatably carried by said differential housing with its axis disposed in fixed parallel relation to said center line, said axis having a fixed position with reference to said axes under all operating conditions of the vehicle, said auxiliary wheel including an annular rim portion the inner circumference of which is toothed, a pneumatic tire on said auxiliary wheel incorporating means whereby the tire when in deflated condition is radially contracted and out of contact with the road surface, such condition being the normal condition of said tire, first gear means connected to said propeller shaft to rotate therewith, second gear means adapted to drivingly interconnect said first gear means and said toothed rim portion, said second gear means being slidable into and out of engagement with said first gear means, means for effecting slidable movement of said second gear means, a source of air pressure carried by the vehicle, and means having connection with said source for inflating said tire, the latter when inflated having a diameter such that when it is in engagement with the road surface the said road wheels are in an elevated position out of engagement with such surface.

6. Apparatus as defined by claim 5 where said second gear means is pneumatically actuated, the necessary air pressure being derived from said source.

7. In a vehicle comprising a differential housing at the rear thereof, together with a propeller shaft operably connected to the mechanism within said housing and a pair of rear road wheels whose axes are fixed and disposed in transverse relation to the longitudinal center line of the vehicle, apparatus for facilitating parking of the vehicle comprising: an auxiliary wheel rotatably carried by said differential housing with its axis disposed in fixed parallel relation to said center line, said axis having a fixed position with reference to said axes under all operating conditions of the vehicle, said auxiliary wheel including a rim formed to provide an annular air chamber and comprising an annular wall portion having a toothed inner circumference, a pneumatic tire on said rim and open to said air chamber, said tire being normally deflated and incorporating means whereby when it is in such condition it is radially contracted and out of contact with the road surface, first gear means connected to said propeller shaft to rotate therewith, second gear means adapted to drivingly interconnect said first gear means and said toothed rim portion, said second gear means being slidable into and out of engagement with said first gear means, means for effecting such movement of said second gear, a source of air pressure carried by the vehicle, and means having connection with said source for inflating said tire through said air chamber, said tire when in inflated condition having a diameter such that it engages the road surface while maintaining said road wheels out of engagement with such surface.

8. Apparatus as defined by claim 7 where said means for inflating said tire comprises a fixed conduit opening to said annular chamber through a sealing slip ring assembly, fluid flow through said conduit being under the control of a valve therein having a position whereat air is vented from the conduit.

9. Apparatus as defined by claim 7 where said means for effecting sliding movement of said second gear means comprises a pneumatic motor including a cylinder fixed to said differential housing and a piston operably connected to said second gear means, said piston being spring loaded in a direction corresponding to the disengaged position of said second gear means, said motor being under the control of a valve connected to said source and having a position whereat air is vented from said cylinder.

References Cited in the file of this patent
UNITED STATES PATENTS

| | | |
|---|---|---|
| 1,642,960 | Krantz | Sept. 20, 1927 |
| 1,888,149 | Trurau | Nov. 15, 1932 |
| 1,948,043 | Meffat | Feb. 20, 1934 |
| 2,136,570 | Walker | Nov. 15, 1938 |